United States Patent
Ünlü et al.

(10) Patent No.: US 9,982,206 B2
(45) Date of Patent: May 29, 2018

(54) COAL FEEDING SYSTEM

(71) Applicant: TUBITAK, Cankaya (TR)

(72) Inventors: Alper Ünlü, Gebze (TR); Ufuk Kayahan, Gebze (TR)

(73) Assignee: TUBITAK, Cankaya (TR)

( * ) Notice: Subject to any disclaimer, the term of this patent is extended or adjusted under 35 U.S.C. 154(b) by 0 days. days.

(21) Appl. No.: 15/322,175

(22) PCT Filed: Jun. 26, 2015

(86) PCT No.: PCT/IB2015/054834
§ 371 (c)(1),
(2) Date: Dec. 27, 2016

(87) PCT Pub. No.: WO2015/198285
PCT Pub. Date: Dec. 30, 2015

(65) Prior Publication Data
US 2017/0145325 A1    May 25, 2017

(30) Foreign Application Priority Data
Jun. 27, 2014   (TR) .............................. a 2014/07552

(51) Int. Cl.
*B65G 53/40*   (2006.01)
*C10J 3/50*    (2006.01)
(Continued)

(52) U.S. Cl.
CPC .............. *C10J 3/506* (2013.01); *B65G 33/14* (2013.01); *B65G 53/08* (2013.01);
(Continued)

(58) Field of Classification Search
None
See application file for complete search history.

(56) References Cited

U.S. PATENT DOCUMENTS 1,289,144 A * 12/1918 Flanegin ................. F23D 11/10
                                                              406/144
3,969,068 A *  7/1976 Miller ..................... C03B 5/235
                                                              110/106
(Continued)

FOREIGN PATENT DOCUMENTS

CA        2695025        8/2009
CN      102520462 A      6/2012
(Continued)

*Primary Examiner* — William R Harp
(74) *Attorney, Agent, or Firm* — Gokalp Bayramoglu

(57) ABSTRACT

This invention is about a coal feeding system (1) which feeds pulverized coal and oxygen separately and vertically through concentric pipes directly to the upper level of the reactor (R) at entrained flow gasification systems. The system (1) consists a top intake (2), a side intake (3), an air supply chamber (4), an oxygen port (5), an ultrasonic sensor port (6), an inner concentric pipe (7), and an outer concentric pipe (8). The system (1) also operates with a coal bunker (K), a screw feeder (B) for adjusting the coal mass flow rate from the coal bunker (K) through the coal feeding system (1) to the reactor (R), and a reactor (R) where the coal are sprayed from the coal feeding system (1) and gasified at high temperatures.

4 Claims, 2 Drawing Sheets

(51) Int. Cl.
*B65G 33/14* (2006.01)
*B65G 53/08* (2006.01)

(52) U.S. Cl.
CPC .... *C10J 2200/158* (2013.01); *C10J 2300/093* (2013.01); *C10J 2300/0956* (2013.01); *C10J 2300/0959* (2013.01)

(56) References Cited

U.S. PATENT DOCUMENTS

| | | | | |
|---|---|---|---|---|
| 4,017,253 A | * | 4/1977 | Wielang | F23D 11/101 110/245 |
| 4,193,773 A | * | 3/1980 | Staudinger | C10J 3/506 110/101 R |
| 4,241,673 A | * | 12/1980 | Smith | F23D 1/00 110/264 |
| 4,255,161 A | * | 3/1981 | Grimminger | B01J 3/02 264/101 |
| 4,302,353 A | * | 11/1981 | Escher | C10J 3/506 241/1 |
| 4,313,386 A | * | 2/1982 | Boldt | F23K 3/02 110/101 CF |
| 4,490,077 A | * | 12/1984 | Shimada | G01F 1/74 406/124 |
| 4,501,205 A | * | 2/1985 | Funk | C10L 1/32 110/262 |
| 4,502,633 A | * | 3/1985 | Saxon | C01B 3/363 239/132.3 |
| 4,563,196 A | * | 1/1986 | Seipenbusch | C10J 3/506 252/373 |
| 4,591,331 A | * | 5/1986 | Moore | F23D 1/00 110/189 |
| 4,705,535 A | * | 11/1987 | Lipp | B05B 7/0433 239/61 |
| 4,902,223 A | * | 2/1990 | Young | F23D 1/00 110/189 |
| 4,903,901 A | | 2/1990 | Kim et al. | |
| 5,188,296 A | * | 2/1993 | Duez | B05B 7/0458 239/403 |
| 5,451,034 A | | 9/1995 | Ulveling et al. | |
| 6,202,576 B1 | * | 3/2001 | Nagl | B01J 8/0015 110/216 |
| 6,319,458 B1 | | 11/2001 | Jung et al. | |
| 6,843,185 B1 | * | 1/2005 | Taylor | F23C 9/003 110/188 |
| 7,448,282 B2 | | 11/2008 | Wiest et al. | |
| 7,559,286 B2 | * | 7/2009 | Brown | F23D 1/00 110/261 |
| 8,196,531 B2 | | 6/2012 | Degenkolb et al. | |
| 9,228,744 B2 | * | 1/2016 | Ergut | F23D 14/22 |

FOREIGN PATENT DOCUMENTS

| | | |
|---|---|---|
| EP | 0198700 A2 | 10/1986 |
| EP | 0237353 A2 | 9/1987 |
| EP | 2216386 A1 | 8/2010 |
| WO | WO2013165122 A1 | 11/2013 |

* cited by examiner

COAL FEEDING SYSTEM

CROSS REFERENCE TO RELATED APPLICATIONS

This application is the national phase entry of International Application No. PCT/IB2015/054834, filed on Jun. 26, 2015, which is based upon and claims priority to Turkish Application No. TR2014/07552, filed on Jun. 27, 2014, the entire contents of which are incorporated herein by reference.

TECHNICAL FIELD

This invention is related with a coal feeding system which provides vertically feeding of dry pulverized coal and oxygen on concentric separate pipes directly to the upper level of the reactor at entrained flow gasifiers.

BACKGROUND OF THE INVENTION

Entrained flow gasifiers are the systems which pulverized coal is sprayed and gasified at high temperatures. During the gasification process, the coal ash is melted and taken out from the bottom of the system and produced tar and contaminants are cracked due to the high temperature. The gasification efficiency is quite high (>% 90) due to the small fuel size (~100 micron)

Coal feeding systems have major importance at the entrained flow gasifiers. One of the coal feeding methods in pressurized entrained flow gasifiers is mixing the coal with some amount of water (slurry) and feeding it to the reactor with a high pressure shiny pump, while another one is feeding the coal as fluidized state with a carrier gas at the pressurized bunkers. In atmospheric gasifiers coal is generally transferred to the reactor with a pneumatic transfer method. As well as mixed feeding of coal and oxygen, separate feeding is also used in the existing technique.

Current known situation of the technique states a pulverized coal burner in a US patent document numbered as U.S. Pat. No. 8,196,531.

The US patent document numbered as U.S. Pat. No. 5,451,034 is about a method which is used for spraying pulverized coal and gas oxidant in the burner and the device developed for this purpose.

A US patent numbered as U.S. Pat. No. 4,903,901 states a device and method used in transferring of solid particles, especially pulverized coal, with a controlled flow.

A US patent numbered as U.S. Pat. No. 6,319,458 states a device used in spraying the pulverized coal.

A Canadian patent document numbered as CA2695025 states a gasification reactor and pulverized coal feeding method for this reactor. At this document it is stated that pulverized coal is fed to the reactor with nitrogen as a carrier gas. There are two separate nitrogen flow sources. The coal mass flow rate can be adjusted with the nitrogen flow rate. The gasification oxidant is also provided from pulverized coal feeder and the reactor temperature can be controlled by adjusting the oxidant and pulverized coal carrying nitrogen flow.

SUMMARY OF THE INVENTION

The main aim of this invention is separately spraying the pulverized coal and oxygen directly to the upper level of the reactor through a vertically oriented device.

The main aim of this device is preventing coal and oxygen from contacting directly until the reactor and eliminating the risks of direct contact of the coal and oxygen together by transferring them separately until the reactor volume.

Another aim of this device is the reducing the maintenance caused by erosion by eliminating the elbows, moving parts etc.

BRIEF DESCRIPTION OF THE DRAWINGS

"A Coal Feeding System", which is built in order to achieve this invention's purpose, is shown in attached figures. These figures are labeled as follows.

DETAILED DESCRIPTION OF THE INVENTION

Figure 1:
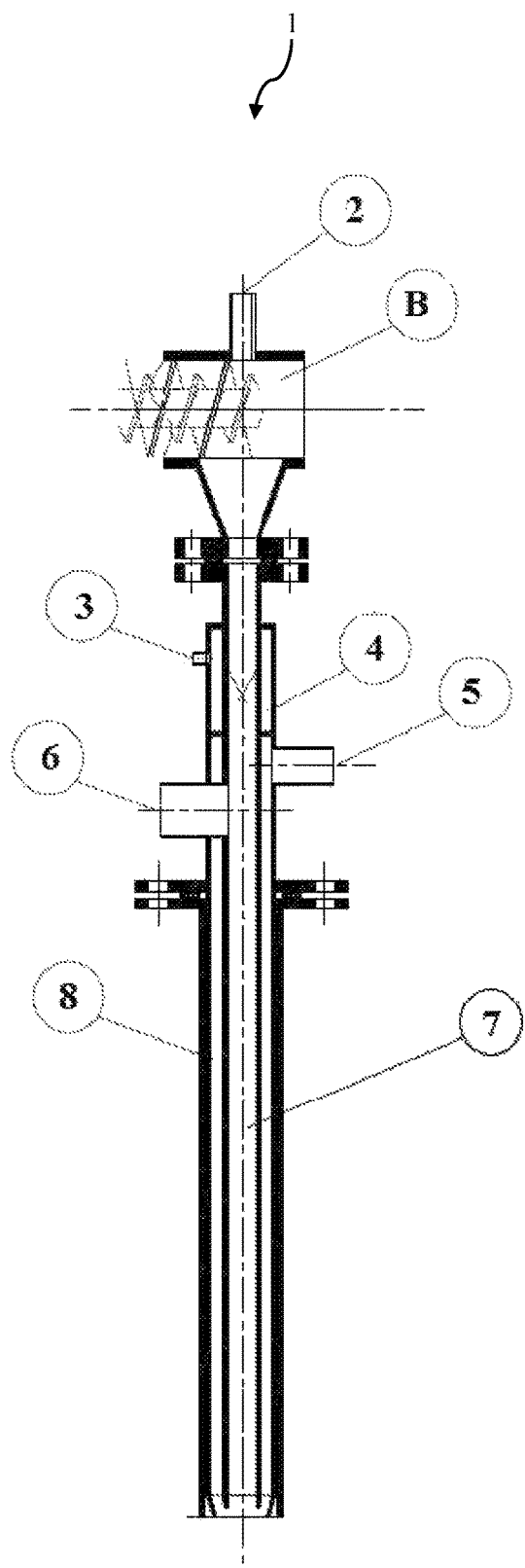
FIG. 1 Schematic drawing of the coal feeding system
FIG. 2 Entrained flow gasification system integrated with the coal feeding system of the present invention
Each part of the system is numbered and labeled as follows:
1. Coal feeding system
2. Top intake
3. Side intake
4. Air supply chamber
5. Oxygen port.
6. Ultrasonic sensor port
7. Inner concentric pipe
8. Outer concentric pipe
K. Coal bunker
B. Screw feeder
R. Reactor
Figure 2:
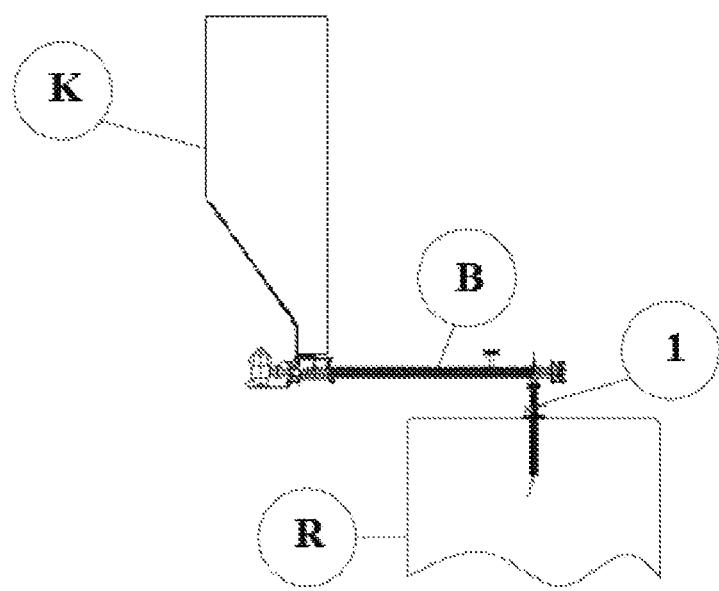

A coal feeding system (1) comprising;
at least one top intake (2) for nitrogen/air supply through the coal feeding system (1),
at least one side intake (3) for nitrogen/air supply through the coal feeding system (1),
at least one air chamber (4) for the storage of air/nitrogen supplied from side intake (3),
at least one oxygen supply port (5) for supplying the oxygen through the coal feeding system (1),
at least one ultrasonic sensor port (6) for observation of coal flow by an ultrasonic sensor,
at least one inner concentric pipe (7) for the flow of the air or nitrogen supplied from the top intake (2) and the side intake (3) through the air chamber and inner holes respectively and the coal supplied from the screw feeder (B) to the reactor (R),
at least one outer concentric pipe (8) for the flow of the oxygen, supplied from the oxygen supply port (5) to the reactor (R) (FIG. 1).

The coal feeding system in accordance with the present invention (1) is a system (1) which has a spraying methodology based on ejector principle.

The system (1) generally operates with a coal bunker (K) which has a rectangular section and sloped 60° for smooth feeding on one side, a screw feeder (B) which is used for adjusting the coal feeding rate, and a reactor (R) where the high temperature (~1500° C.) gasification takes place.

Top intake (2) is used for air/nitrogen supply from top of the coal feeding system (1) through the reactor (R).

Side intake (3) is used for air/nitrogen supply from side of the coal feeding system (1) through the reactor (R).

Air supply chamber (4) supplies air/nitrogen to the inner concentric pipe (7) taken from the side intake (3), through preferentially three holes which increase air nitrogen velocity.

Oxygen feeding port (5) is used for feeding of the oxygen to the coal feeding system (1).

Ultrasonic sensor port (6) is used for the coal flow monitoring at the inner concentric pipe (7) with the ultrasonic sensor at this port.

Inner concentric pipe (7) is the pipe which is surrounded by outer concentric pipe (8), is used for transferring the coal from the screw feeder (B) and the air/nitrogen from the top intake (2), the side intake (3), and through air supply chamber (4) holes to the reactor (R).

Outer concentric pipe (8) is a pipe used for transferring oxygen from the oxygen port (5) to the reactor (R) and preferentially produced with a 15° slope through the inner concentric pipe (7) at the reactor (R) side.

The coal feeding system of the invention (1) provides coal feeding for an entrained flow gasification system. The coal taken from the coal bunker (K) is adjusted to a prespecified mass flow rate with the screw feeder (B) by adjusting rpm of the screw and transferred to the coal feeding system (1). The air/nitrogen provided with a pressure of 5-7 bars through the side intake (3) creates a vacuum at the entrance of the coal feeding system (1). This vacuum is broken by the air/nitrogen which is provided about five times of the side intake (3) mass flow rate from the top intake (2) to the inner concentric pipe (7) which is welded at the outer shell of the screw feeder (B) and a nitrogen, column is created. Due to the broken vacuum, uncontrolled coal suction is prevented and only the desired amount of coal, adjusted by the screw feeder (B), is released at this nitrogen column for spraying. The coal particles dragged by nitrogen streamline are sprayed to the reactor (R). The gasification oxygen is provided from the oxygen port (5) through the outer concentric pipe (8) without mixing the coal. Since the outer concentric pipe (8) which the oxygen passes through and the inner concentric pipe (7) which the coal passes through are two separate pipes, the coal and the oxygen meets at the very entrance of the reactor (R) and this prevents the risks brought by the mixing of pulverized coal and oxygen.

Within the coal feeding system (1) of the subject of the invention, the air/nitrogen provided from the side intake (3) fills the air supply chamber (4) and is transferred from here to inner concentric pipe (7) through the holes which have millimetric dimensions. The holes are connecting the air supply chamber (4) to the inner concentric pipe (7) and the air/nitrogen gains velocity at these holes. These holes have millimetric dimensions and have an angle about −60° with the horizontal plane The flow of nitrogen/air to the end of the inner concentric pipe (7) having this angled high speed of air/nitrogen creates a vacuum at the top entrance of the coal feeding system (1). A nitrogen/air flow starts through this vacuum from the top intake (2) which creates a nitrogen/air column and pulverized particles are entrained and sprayed with this column of nitrogen/air created in the inner concentric pipe (7) to the reactor (R). The oxygen necessary for gasification is provided from the oxygen port (5). After initial entrance of the system, oxygen then passes to outer concentric pipe (8) and flows through the reactor where oxygen, at the exit of the outer concentric pipe (8), located in the reactor (R) meets with the oxygen/air and pulverized coal particles coming from the inner concentric pipe (7). At the reactor side tip of the coal feeding system (1) the oxygen and the coal and air/nitrogen mixture are came in contact and the gasification reactions start inside the reactor. This separate feeding of coal particles and the oxygen prevents the flashback risks. The oxygen flows from the outer concentric pipe (8) also cools down the inner concentric pipe and materials inside which minimizes the effect of temperature and thereby also contributes to the security of the coal feeding system (1). Coal flow monitoring is provided by an ultrasonic sensor mounted to the ultrasonic sensor port included to the coal feeding system (6).

Various kinds of applications can be developed with the concept of this invention (1), and cannot be bounded with the examples given in this document.

What is claimed is:

1. A coal feeding system providing dry pulverized coal feeding, comprising:
    a coal bunker for dry coal storage, wherein the coal bunker is provided with a rectangular section and has a 60° slope for smooth feeding on only one side and all other sides of the coal bunker have a 90° slope;
    a screw feeder for adjusting a dry pulverized coal mass flow rate, wherein the screw feeder is connected to the coal bunker;
    an inner concentric pipe welded at an outer shell of the screw feeder;
    an outer concentric pipe surrounding the inner concentric pipe;
    a top intake welded on an outer wall of the screw feeder and configured for a first nitrogen or air flow supply to the inner concentric pipe;
    an air supply chamber formed between a first side wall of the inner concentric pipe and a second side wall of the outer concentric pipe;
    a side intake provided on and perpendicular to the second side wall of the outer concentric pipe for a second nitrogen or air flow supply to the air supply chamber, wherein the air supply chamber has three holes leading to the inner concentric pipe for transferring the second nitrogen or air flow supply to the inner concentric pipe;
    an oxygen port disposed lower than the side intake and configured for providing oxygen to the outer concentric pipe, wherein the outer concentric pipe is configured for transferring the oxygen from the oxygen port to an output point of the inner concentric pipe and further to a reactor connected to the second side wall of the outer concentric pipe;
    an ultrasonic sensor port provided on the first side wall of the inner concentric pipe and disposed lower than the oxygen port and configured for coal flow monitoring at the inner concentric pipe with a mounted ultrasonic sensor;
    wherein the inner concentric pipe is configured for transferring the first nitrogen or air flow supply from the top intake, the second nitrogen or air flow supply from the side intake, and coal from the screw feeder, to the reactor;
    wherein the inner concentric pipe is concentric with the top intake;
    wherein the coal taken from the coal bunker is adjusted to a pre-specified mass flow rate with the screw feeder by adjusting rpm of the screw feeder and transferred to the inner concentric pipe;
    wherein the second nitrogen or air flow supply is provided with a pressure of 5-7 bars through the side intake and the first nitrogen or air flow supply is provided about five times of a mass flow rate of the side intake from the top intake to the inner concentric pipe such that a nitrogen or air column is created;
    wherein coal particles dragged by the nitrogen or air column are sprayed to the reactor; gasification oxygen is provided from the oxygen port through the outer concentric pipe without mixing the coal; the outer concentric pipe that the gasification oxygen passes through and the inner concentric pipe that the coal particles pass through are two separate pipes.

2. The coal feeding system according to claim 1, wherein the second nitrogen or air flow supply passing through the three holes gaining velocity to the inner concentric pipe, wherein the three holes have millimetric dimensions and have an angle about −60° with the horizontal plane.

3. The coal feeding system according to claim 2, wherein the outer concentric pipe has a slope of 15° at a reactor side of the inner concentric pipe.

4. The coal feeding system according to claim 1, wherein the outer concentric pipe has a slope of 15° at a reactor side of the inner concentric pipe.

* * * * *